(12) United States Patent
Fraueneder et al.

(10) Patent No.: US 10,424,922 B2
(45) Date of Patent: Sep. 24, 2019

(54) POWER SUPPLY DEVICE FOR AN INJECTION MOULDING MACHINE

(71) Applicant: ENGEL AUSTRIA GmbH, Schwertberg (AT)

(72) Inventors: Harald Fraueneder, Garsten (AT); Gerhard Dimmler, Steinhaus (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 1020 days.

(21) Appl. No.: 14/217,702

(22) Filed: Mar. 18, 2014

(65) Prior Publication Data

US 2014/0285162 A1 Sep. 25, 2014

(30) Foreign Application Priority Data

Mar. 19, 2013 (AT) .................................. A 215/2013

(51) Int. Cl.
*H02J 1/16* (2006.01)
*B29C 45/76* (2006.01)
(Continued)

(52) U.S. Cl.
CPC ............ *H02J 1/16* (2013.01); *B29C 45/7666* (2013.01); *H02K 7/02* (2013.01); *H02P 11/04* (2013.01);
(Continued)

(58) Field of Classification Search
CPC ............... H02J 1/16; H02K 7/02; H02P 11/04
(Continued)

(56) References Cited

U.S. PATENT DOCUMENTS 5,621,777 A    4/1997  Ring
5,811,037 A *  9/1998  Ludwig ................. B29C 45/76
                                              264/328.1
(Continued)

FOREIGN PATENT DOCUMENTS

CA         2506228 A1 *  6/2004  ............. B60K 6/105
DE   10 2006 033 562     2/2008
(Continued)

OTHER PUBLICATIONS

Chinese Search Report dated Dec. 22, 2015 in corresponding Chinese Application No. 201410192653.4.
(Continued)

*Primary Examiner* — Adolf Berhane
*Assistant Examiner* — Bart Iliya
(74) *Attorney, Agent, or Firm* — Wenderoth Lind & Ponack, L.L.P.

(57) ABSTRACT

A power supply device for a molding machine with an intermediate circuit, which can be connected with at least one drive of the molding machine and is suitable for supplying the at least one drive with electrical energy; a supply module connected to the intermediate circuit; an energy storage device connected to the intermediate circuit; and a closed loop control device for closed loop controlling an energy content of the energy storage device. The energy storage device can be closed loop controlled by means of the closed loop control device so that the energy content of the energy storage device does not go outside a range, in which a power input and/or a power output of the energy storage device is essentially constant.

18 Claims, 2 Drawing Sheets

(51) Int. Cl.
*H02P 11/04* (2006.01)
*H02K 7/02* (2006.01)

(52) U.S. Cl.
CPC .............. *B29C 2045/7673* (2013.01); *B29C 2945/7623* (2013.01); *B29C 2945/76026* (2013.01); *B29C 2945/76033* (2013.01); *B29C 2945/76214* (2013.01); *B29C 2945/76454* (2013.01); *B29C 2945/76518* (2013.01); *B29C 2945/76525* (2013.01); *B29C 2945/76846* (2013.01); *B29C 2945/76866* (2013.01); *B29C 2945/76869* (2013.01); *B29C 2945/76936* (2013.01); *H02P 2201/03* (2013.01); *Y02P 70/261* (2015.11); *Y10T 307/313* (2015.04)

(58) Field of Classification Search
USPC ..................................................... 323/204
See application file for complete search history.

(56) References Cited

U.S. PATENT DOCUMENTS

| | | | |
|---|---|---|---|
| 6,333,611 B1 | 12/2001 | Shibuya et al. | |
| 6,788,029 B1 * | 9/2004 | Gabrys | H02J 1/16 307/67 |
| 8,044,631 B2 * | 10/2011 | Dai | H02M 7/53873 318/727 |
| 8,749,083 B2 * | 6/2014 | Nomoto | F03D 1/04 290/44 |
| 2004/0105910 A1 * | 6/2004 | Ickinger | B29C 45/4005 425/556 |
| 2005/0258795 A1 | 11/2005 | Choi | |
| 2008/0016940 A1 | 1/2008 | Schmeink | |
| 2012/0009297 A1 | 1/2012 | Ochi | |
| 2013/0271083 A1 * | 10/2013 | Williams | H02J 3/28 320/128 |
| 2015/0162799 A1 * | 6/2015 | Ilan | H02K 7/025 310/74 |

FOREIGN PATENT DOCUMENTS

| | | |
|---|---|---|
| DE | 10 2010 023 536 | 12/2011 |
| WO | 2005/110711 | 11/2005 |

OTHER PUBLICATIONS

Austrian Patent Office Search Report (ASR) issued Mar. 17, 2014 in Austrian Patent Application No. A 215/2013.

* cited by examiner

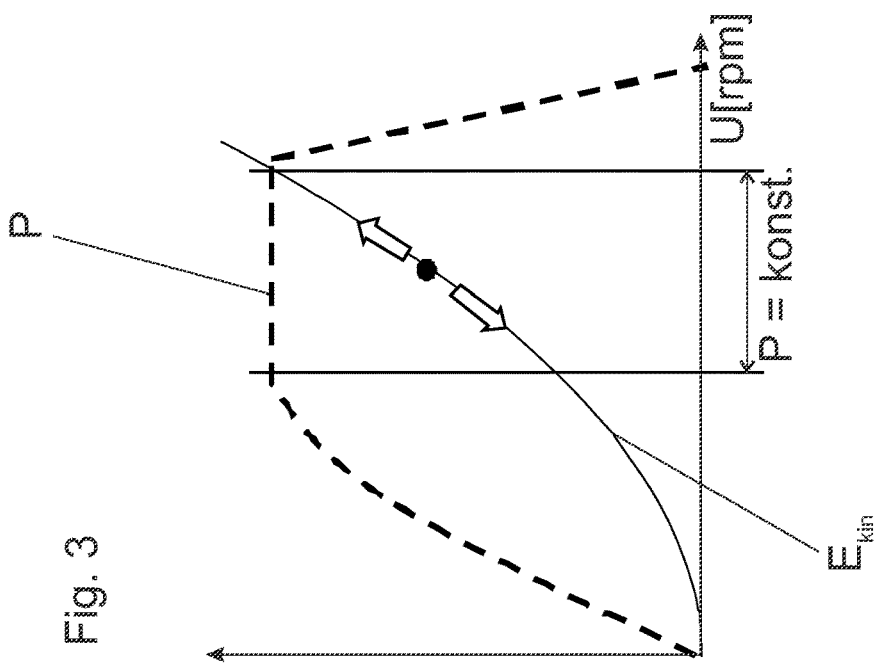
Fig. 3
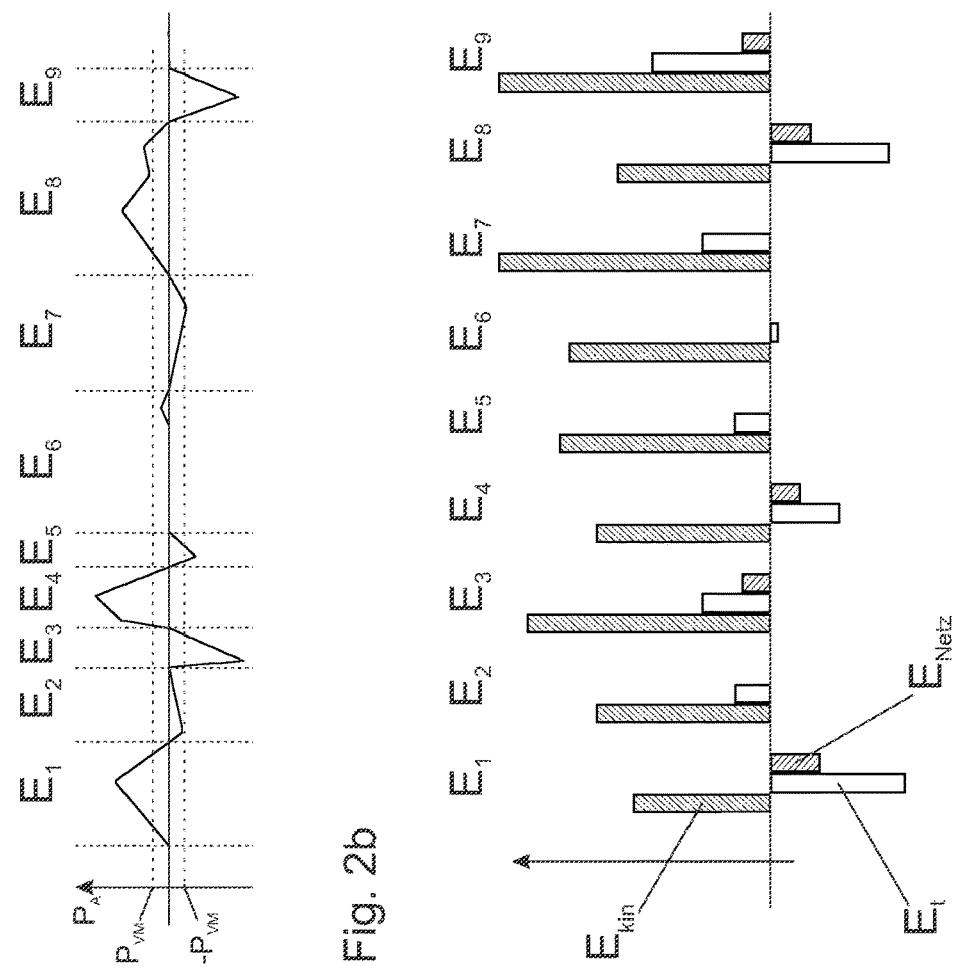
Fig. 2a
Fig. 2b

POWER SUPPLY DEVICE FOR AN INJECTION MOULDING MACHINE

FIELD OF INVENTION

The invention relates to a power supply device for a moulding machine.

BACKGROUND

Moulding machines shall be understood here to be injection moulding machines, transfer moulding presses, presses and in particular vertical presses and the like. For the sake of simplicity reference will frequently be made to an injection moulding machine, but without this being understood to be restrictive, since equivalent statements also apply to other moulding machines.

Generic power supply devices serve to supply electrical energy to most electrical drive systems of the injection moulding machine—for example clamping drives and injection drives. They have an intermediate circuit to which a supply module is connected. The supply module is connected to a power supply network and ensures that the correct voltage is fed into the intermediate circuit from the power supply network.

The drives of the injection moulding machine are then connected to the intermediate circuit and receive their electrical power from this.

Since power supply networks generally deliver AC voltage and since in the intermediate circuit a DC voltage should usually prevail, the supply module in most cases comprises a rectifier. If the power supply network already delivers the desired type of current (direct current or alternating current, desired voltages), then in its simplest form the supply module would merely comprise connecting leads between the power supply network and the intermediate circuit.

The most common type of intermediate circuit for injection moulding machines is, as mentioned, a DC voltage intermediate circuit. In the state of the art this essentially comprises a capacitor connected in parallel. In generic power supply devices however other intermediate circuit designs can indeed also be used.

It is known, in addition to the drives of the injection moulding machine, to connect an energy storage device to the intermediate circuit (see U.S. Pat. No. 6,333,611 B1). From WO 2005/110711 A1, for example, it is also known to execute this energy storage device as a flywheel with a drive, wherein the energy is stored as kinetic energy of the rotating flywheel.

This allows energy returned from electrical drives to be stored in the energy storage device and later reused. If a component is for example slowed down, an electrical drive can work as a generator delivering the energy to the energy storage unit and this energy can be used to accelerate this or any other drive.

The disadvantage with generic energy supplies is that in the intermediate circuit quite high fluctuations and peaks occur for example in the intermediate circuit voltage or a current strength in the intermediate circuit. The reason for this is that with injection moulding machines both very high and very small amounts of energy are transferred. As a rule, over short periods very high amounts of energy are discharged from the intermediate circuit, and these are followed by periods in which this happens only to a very small extent.

Introducing closed loop control of the intermediate circuit on its own does not provide a remedy, for it is difficult to closed loop control the drives of the injection moulding machine in such a way that the peaks and fluctuations are significantly suppressed. The drives that are normally used in injection moulding machines respond too slowly for this or are unable to utilise the available energy at the respective point in time.

The fluctuations and peaks in the intermediate circuit mean that comprehensive overload protection devices have to be provided, which is of course detrimental to the cost efficiency.

SUMMARY

The purpose of the invention is to provide a power supply device for an injection moulding machine which has lower fluctuations in the intermediate circuit compared with the state of the art.

This purpose is achieved by a power supply device with the features of claim 1.

Because the energy storage device can be closed loop controlled by means of the closed loop control device in such a way that the energy content of the energy storage device does not go outside a range, in which a power input and/or a power output of the energy storage device is essentially constant, fluctuations occurring in the intermediate circuit can be better compensated. Put another way, since it only ever delivers or absorbs energy in an optimum range, the energy storage device remains well under control and thus allows precise compensation of peaks and fluctuations in the intermediate circuit.

This also means that the supply module can be dimensioned smaller, since it is placed under less stress, so that of course there is a cost saving.

The invention can be used in moulding machines of all kinds.

Further advantageous embodiments of the invention are defined in the dependent claims.

A particularly simple construction of an energy storage device, having a broad range with constant power input and constant power output, can be achieved by the energy storage device having a flywheel and an accumulator drive for accelerating and slowing down the flywheel and by the speed of the flywheel being closed loop controlled so that the speed does not go outside a range in which a power input and/or a power output of the accumulator drive is essentially constant.

For a particularly simple construction it can be provided here that the accumulator drive takes the form of an electrical drive, wherein the flywheel preferably takes the form of a rotor of the accumulator drive.

In a preferred embodiment the intermediate circuit takes the form of a DC voltage intermediate circuit, that is to say that the intermediate circuit has a condenser, to which the supply module, the energy storage device and the at least one drive are connected in parallel, wherein optimally a DC voltage is applied to the condenser. In a power supply device according to the invention the capacitance of the condenser can be dimensioned to be much smaller than in the state of the art, since because closed loop control is easier to achieve only very small quantities of energy have to be stored in the intermediate circuit itself. It is even possible for no condenser to be installed, for the capacitance, which is created by the electrical leads of the intermediate circuit, is potentially adequate.

Particularly stable conditions can be created in the intermediate circuit, by having an intermediate circuit voltage that can be closed loop controlled in the intermediate circuit. This is particularly the case if a nominal intermediate circuit voltage, at which the circuit voltage can be closed loop controlled, is essentially constant.

In particular if the at least one drive is to be supplied with AC voltage, it can be provided that the connection between the intermediate circuit and the at least one drive via the at least one drive can be closed loop controlled via a drive supply module, which preferably has a device for inverting a DC voltage.

Further preference is for the provision of an embodiment, in which the excess electrical energy, present in the intermediate circuit and/or the energy storage device, can be fed back via the supply module to a power supply network. Closed loop control of the energy content in the energy storage device is simplified in this way for if the energy content is temporarily very high, without the energy being needed by drives, this can be delivered to the power supply network.

Particular preference here is for an embodiment in which a rectifier is present in the supply module, which converts an AC voltage of the power supply network into a DC voltage for the intermediate circuit, and an inverter, which in the case of feedback converts the DC voltage of the intermediate circuit into an AC voltage of the power supply network.

It can furthermore be provided that the supply module has a line choke and/or a line filter to reduce undesired fluctuations in an electric current fed back to the power supply network.

Protection is also sought for an injection moulding machine with a power supply device according to the invention, wherein the intermediate circuit is connected with the at least one drive.

Particular preference is for an embodiment in which the injection moulding machine is an electric injection moulding machine, that is to say that the at least one drive is in the form of an electrical drive. The most important examples of such drives are firstly a clamping drive of the clamping unit and also an injection drive of the injection unit. A further example would be a drive for an ejector on an injection mould.

Protection is furthermore sought for a method for operating a power supply device according to the invention and an injection moulding machine with a power supply device according to the invention, wherein the energy storage device is charged prior to an injection moulding cycle to a level at which the energy content of the energy storage device is in a range in which the energy storage device is able to absorb or deliver a constant power.

Here it is preferably provided that an energy to supply the at least one drive during an injection moulding cycle is delivered in part by the energy storage device and/or that an energy returned from the at least one drive during the injection moulding cycle is delivered in part to the energy storage device. This allows an optimum, that is to say smallest possible, dimensioning of the energy storage device, which can contribute to reducing costs. Of course it is quite possible that the energies delivered to and from the drive are provided or absorbed, respectively, in full by the energy storage device.

BRIEF DESCRIPTION OF THE DRAWINGS

Further advantages and details of the invention are illustrated by the figures and the associated description of the figures. These show as follows:

FIG. 2a examples of a number of energy transfer processes between the intermediate circuit and the at least one drive, FIG. 2b various energy quantities, arising during the energy transfer processes, and FIG. 3 a power curve and the stored kinetic energy of a flywheel as a function of speed.

DETAILED DESCRIPTION

Figure 1:
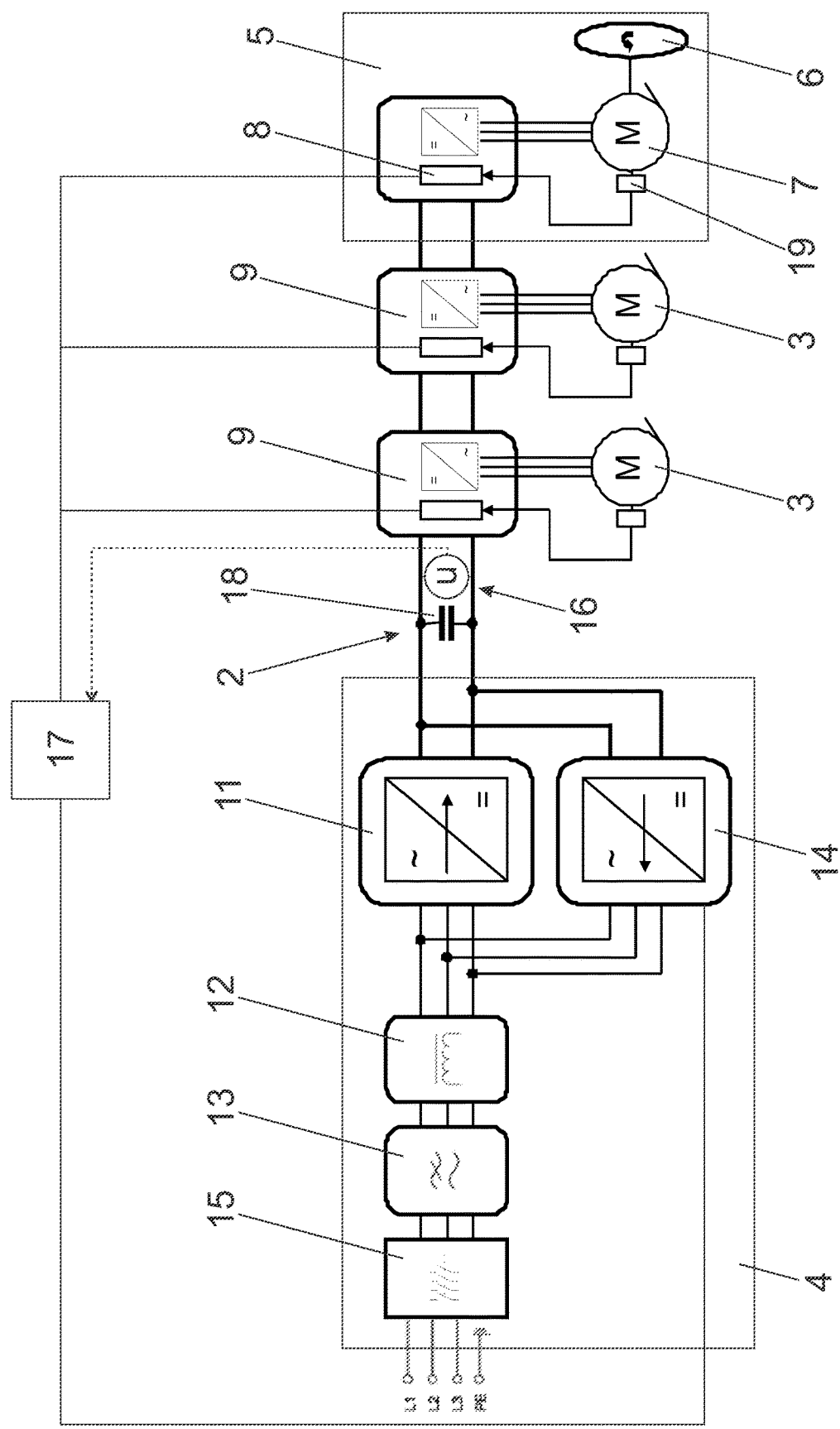
FIG. 1 a schematic diagram of a power supply device according to the invention.

The diagram represented in FIG. 1 of a power supply device according to the invention shows to begin with the intermediate circuit 2 with its condenser 18. An energy supply module 4 and two drive supply modules 9 are connected in parallel to the condenser 18, wherein the drive supply modules 9 provide an AC voltage for the electrical drives 3. The closed loop control device 8 and the intermediate circuit voltage closed loop control 17 can of course be present in a single component and in modern injection moulding machines are as a rule integrated into the machine control.

In addition the energy storage device 5 is connected in parallel with the condenser 18. The energy storage device 5 has a flywheel 6, which is in the form of the rotor of an accumulator drive 7. The accumulator drive 7 is in this case an asynchronous machine, so that the power input and power output at a certain speed U are essentially equal.

The energy storage device 5 also has a closed loop control device 8, which keeps the speed U of the flywheel within a range in which the power output of the accumulator drive 7 is constant. Here the speed U is measured via a rotary encoder 19 on the accumulator drive 7.

The energy supply module 4 is connected via the contacts L1, L2, L3 and PE with a power supply network and has firstly a rectifier 11, which converts an AC voltage of the power supply network into a DC voltage for the intermediate circuit 2, and also in parallel to this an inverter 14, which converts the DC voltage of the intermediate circuit 2 into an AC voltage for the power supply network. Of course both the rectifier 11 and the inverter 14 are designed so that only small quantities of energy can flow against the respective intended direction.

The supply module 4 further has a line choke, which converts fluctuations occurring after the inverter 14 with frequencies that are too high for the power supply network into lower frequency fluctuations. A line filter 13 is also provided, which filters out further fluctuations with an undesired frequency. Finally the supply module 4 has physical switches 15, which are required by the closed loop controls in systems, like injection moulding machines, in which relatively high voltages and currents occur.

An intermediate circuit voltage u is closed loop controlled with the help of an intermediate circuit voltage closed loop control 17. The instantaneous intermediate circuit voltage u is measured here by a voltmeter 16 and notified to the intermediate circuit voltage closed loop control 17. This is further connected to the closed loop control device 8, the drive supply modules 9, the rectifier 11 and the inverter 14. This allows the intermediate circuit voltage closed loop control 17 to balance the various energy flows (power supply network L1, L2, L3, PE, energy storage device 5 and drives 3) so that the DC voltage in the intermediate circuit 2 is constant at preferably 750 Volts.

FIG. 2a gives nine examples of energy transfers $E_1$ to $E_9$ from the intermediate circuit 2 to the drives 3. In FIG. 2b, in parallel to this, for each energy transfer $E_1$ to $E_9$ the energy content $E_{kin}$ (left bar in each case) of the energy storage device 5, the energy $E_t$ absorbed in each case by the energy storage device 5 (middle bar in each case) and the energy $E_{Netz}$ fed back to the network (right bar in each case) are shown. Energy returned by the drives 3 and energy obtained from the power supply network is in each case illustrated by a negative value.

As a result of the precise closed loop control of the intermediate circuit voltage achieved by the invention, the supply module can be dimensioned to be correspondingly smaller. In FIG. 2a, for comparison with the powers which are drawn by the drives 3 during an injection moulding cycle, the maximum permitted power $P_{VM}$ (in both directions) has been marked. If there is no precise closed loop control of the intermediate circuit, the supply module 4 must of course be dimensioned to be considerably larger, so that it is in a position to balance out peaks.

If the rotor of an asynchronous machine is used as a flywheel 6, a relatively broad range of constant power of the accumulator drive 7 results. This is shown in FIG. 3. Apart from the power P as a function of the speed U the kinetic energy $E_{kin}$ that is stored at a certain speed in the energy storage device 5 is also marked.

A range for the speed U, in which the accumulator drive 7 has a constant power input/power output P, can be between 1 000 rpm and 6 000 rpm, preferably between 2 000 rpm and 5 000 rpm and particularly preferably between 2 800 rpm and 4 600 rpm.

The present invention is not limited to the embodiment represented here. Thus the energy storage device does not have to have a flywheel. Energy storage devices with constant power input and output can for example also be created by storage of electrical or hydraulic energy.

The invention claimed is:

1. A power supply device for a moulding machine, comprising:
    an intermediate circuit, connected with at least one drive of the moulding machine and suitable for supplying the at least one drive with electrical energy;
    a supply module connected to the intermediate circuit;
    an energy storage device connected to the intermediate circuit, and
    a closed loop control device for closed loop controlling an energy content of the energy storage device,
    wherein the energy storage device is closed loop controlled by the closed loop control device so that the energy content of the energy storage device does not go outside a range, in which a power input or a power output of the energy storage device is essentially constant.

2. The power supply device according to claim 1, wherein the energy storage device has a flywheel and an accumulator drive for accelerating and slowing down the flywheel and a speed of the flywheel is closed loop controllable so that the speed does not go outside a range in which a power input or a power output of the accumulator drive is essentially constant.

3. The power supply device according to claim 2, wherein the accumulator drive is in the form of an asynchronous machine.

4. The power supply device according to claim 2, wherein the accumulator drive is in the form of an electrical drive, wherein the flywheel is preferably in the form of a rotor of the accumulator drive.

5. The power supply device according to claim 1, wherein the intermediate circuit is in the form of a DC voltage intermediate circuit.

6. The power supply device according to claim 1, wherein an intermediate circuit voltage is closed loop controlled in the intermediate circuit.

7. The power supply device according to claim 6, wherein a nominal intermediate circuit voltage, at which the intermediate circuit voltage is closed loop controlled, is essentially constant.

8. The power supply device according to claim 1, wherein for connecting the intermediate circuit with the at least one drive at least one drive supply module for supplying the at least one drive with at least one drive AC voltage is provided.

9. The power supply device according to claim 1, wherein the supply module is connected with a power supply network and has a rectifier for rectifying a supply voltage of the power supply network.

10. The power supply device according to claim 1, wherein excess electrical energy, present in the intermediate circuit or the energy storage device, is fed back via the supply module to a power supply network.

11. The power supply device according to claim 10, wherein the supply module has a line choke or a line filter for reducing undesired fluctuations in an electrical current fed back to the power supply network.

12. The power supply device according to claim 1, wherein the moulding machine is an injection moulding machine.

13. A moulding machine with a power supply device according to claim 1, wherein the intermediate circuit is connected with the at least one drive.

14. The moulding machine according to claim 13, wherein the at least one drive is in the form of an electrical drive.

15. The moulding machine according to claim 13, wherein the at least one drive comprises a clamping drive or an injection drive.

16. The moulding machine according to claim 13, wherein the moulding machine is an injection moulding machine.

17. A method for operating a power supply device according to claim 1, wherein the energy storage device is charged prior to an injection moulding cycle to a level at which the energy content of the energy storage device is in a range in which the energy storage device is able to absorb or deliver a constant power.

18. The method according to claim 17, wherein an energy to supply the at least one drive during the injection moulding cycle is delivered in part by the energy storage device or that an energy returned from the at least one drive during the injection moulding cycle is delivered in part to the energy storage device.

* * * * *